March 26, 1963  W. L. POLAND  3,083,012
DELAY DEVICE FOR DOCUMENT FEEDING APPARATUS
Filed June 29, 1960

INVENTOR.
WILLIAM L. POLAND
BY
ATTORNEY

United States Patent Office 3,083,012
Patented Mar. 26, 1963

3,083,012
DELAY DEVICE FOR DOCUMENT FEEDING APPARATUS
William L. Poland, Norwalk, Conn., assignor to Sperry Rand Corporation, New York, N.Y., a corporation of Delaware
Filed June 29, 1960, Ser. No. 39,680
9 Claims. (Cl. 271—64)

This invention relates generally to feeding devices adapted for conveying documents such as bank checks or the like from one processing station to another and has particular reference to mechanism incorporated with the feeding means for delaying, upon receipt of a delay signal, the time of arrival of a document at a processing station after the document has been introduced into the feed path.

The invention is shown herein in an embodiment adapted for use with a bank check sorting machine whereby all checks of a bank clientele, when returned to the bank for payment and prepared for automatic processing by recording thereon in magnetic ink the necessary coded data pertaining to each check, may be sorted in accordance with whether or not payment of the check is to be made. The sorter could be controlled by a central computer in which is stored the current balance in each depositor's account. In such an application the sorter would be provided with a read head past which each check is fed for determining the depositor's account number and the amount of the check. This information read from the check would be sent to the computer to be compared with the depositor's current balance which, if sufficient, would be debited accordingly, whereupon the check would be conveyed by the sorter through segregating means to a receiving pocket for all checks acceptable for payment. In the event that the computer determines that the current balance in the depositor's account is insufficient, the segregating means would be signaled by the computer so as to convey such a check to a reject pocket for all checks upon which payment is not to be made.

In both of the above cases, the time required by the computer for ascertaining the current balance in a depositor's account and comparing it with the amount of a check presented for payment would be substantially the same, so that if these were the only control functions to be performed by the computer the cycle time of the sorter, i.e. the time required for a check to travel from the sensing stage to the segregating stage need only be such as to allow for the maximum amount of time required by the computer to ascertain the balance of the respective account. However, it may also be desired to have the computer perform an additional function with respect to certain of the accounts which would require additional computer time, such a function being, for example, comparing a check with a stop payment order which may have been entered in a particular customer's account and store in the computer so as to permit the sorter to also reject all checks against which a stop payment order has been entered. Although the performance of this latter function would be required for only a small proportion of the checks being sorted, it nevertheless requires additional computer time. Accordingly, if the cycling time of a sorter were regulated to allow in each feed cycle time for all computer functions, the equipment would not be operating at maximum efficiency since the stop payment control function of the computer is required in only relatively few instances during a run with the result the great majority of checks being processed would have to be run at a slower cycle time than is actually required.

The present invention permits the equipment to be operated at maximum efficiency by enabling the sorting apparatus to be run at the maximum speed compatible with the time required by the computer in the usual or great majority of processing cycles, the invention operating to delay the arrival of a document or check at the segregating station in the relatively few or exceptional instances requiring more computer time for performing the control function. As will be apparent from the following description, the delay in the arrival of a check at the segregating station is accomplished without stopping the motion of a check or in any way altering its feed velocity, thereby avoiding the problems which otherwise would be encountered in attempting to accelerate or decelerate checks or documents of this type when feeding at high speed.

It is, therefore, an object of this invention to enable a cyclically operable document feeding mechanism to delay the transit of a document traveling from one feeding stage to another.

It is a further object of this invention to enable a cyclically operable document feeding mechanism to delay the transit of a document traveling from one feeding stage to another without stopping the motion of the feeding document.

It is a further object of the invention to enable a cyclically operable document feeeding mechanism to delay the transit of a document traveling from the feeding stage to the next feeding stage for a variable number of feed cycles.

Further objects of the invention together with the features contributing thereto and advantages accruing therefrom will be apparent from the following description when read in conjunction with the drawings wherein.

Figure 3:
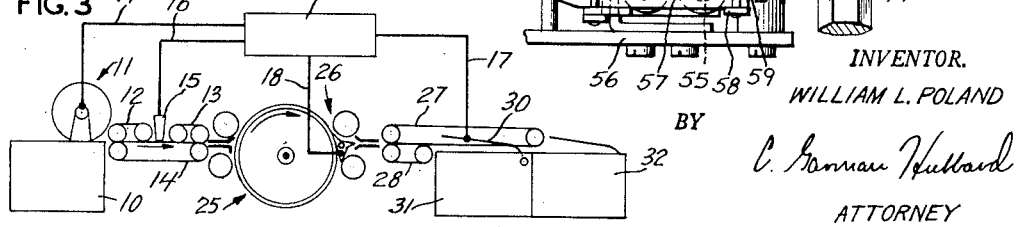
FIG. 3 is a schematic view of a document feeding system adapted for a check sorting operation and incorporating the feed delay mechanism of the instant invention.

Referring first to FIG. 3 there is shown schematically a document feeding system adapted for sorting bank checks according to whether or not payment of a check is to be made. Generally stated, the document feeding apparatus may consist of a feed magazine 10 into which a stack of documents are loaded and from which they are picked up one at a time by a pick up head 11 which may be in the form of a rotating cylinder connected to a vacuum source and which attracts the top document of the stack, separating it from the stack and advancing it to a feed belt system comprised of endless belts 12, 13, 14 which operate to engage the document and convey it past a reading head 15. The reading head, which may be of any conventional design, senses the data recorded in code on each check and immediately transmits it over a lead 16 to a computer 20 in which is stored current balances of all depositors' accounts in addition to identification of all checks against which a stop payment order has been entered. As each check leaves the reading head 15 it is conveyed by the belts 13, 14 to the surface of a rotating feed drum device 25 which, with associated belts, carries the check around to a switch station at which is located a routing switch member 26 which may be set to one of two positions under control of the computer. Member 26 operates normally to strip each document from the surface of drum 25 and direct it to another belt system comprised of endless belts 27, 28 which deliver each document to a segregating station at which is located a document deflector 30. The deflector 30, which is also controlled by the computer 20, is positioned so as to deflect each document received from the belts 27, 28 into an accept pocket 31 or, upon signal from the computer, may be operated so as to close off pocket 31 causing the check to pass over the deflector and be received into a reject pocket 32. As the leading edge of each check is passing from the reading head 15 to the switching station, the data sensed from the check is being transmitted to the computer and compared with the data stored in the computer so that by the time the leading edge of the check reaches the switch member 26 the computer will, in most instances, have completed its comparing function and sent an appropriate signal over lead 17 to the deflector 30 to properly segregate the check and at the same time sending a signal over lead 18 to the switch member 26 to cause the check to be stripped from the drum 25 and advanced to the segregating station. In the event that the computer has not had time to complete its processing functions by the time the leading edge of the check reaches the switching station, due to the time required for performing an additional function with respect to stop payment orders or for any other reason, the switch member 26 will be conditioned by signal over lead 18 so as not to strip the check from the surface of drum 25, and at the same time the computer would signal over lead 19 the pick-up head 11 so as to prevent for at least one cycle the introduction of the next check into the feeding system. Under these circumstances the check carried by the drum device 25, will be routed through a delay path in which it continues to be carried by the drum device 25 for one full rotation, the device preferably being of such a size as to achieve one feed cycle during each complete revolution thereof.

Accordingly, as the drum device 25 continues to rotate the leading edge of the check will again be brought around after the lapse of one complete feed cycle to the switching station whereupon, if the computer has by this time completed its processing function, the switching member 26 will be controlled to then strip the check from the drum and pass it to the segregating station for deflection into the appropriate one of the pockets 31, 32. As soon as the computer has completed its processing function and exercised control over the switching member 26 so as to strip the check from the drum 25, an appropriate signal is also sent to the pick-up head 11 so as to again resume the feeding of checks from the magazine 10 into the belt conveying system.

Figure 1:
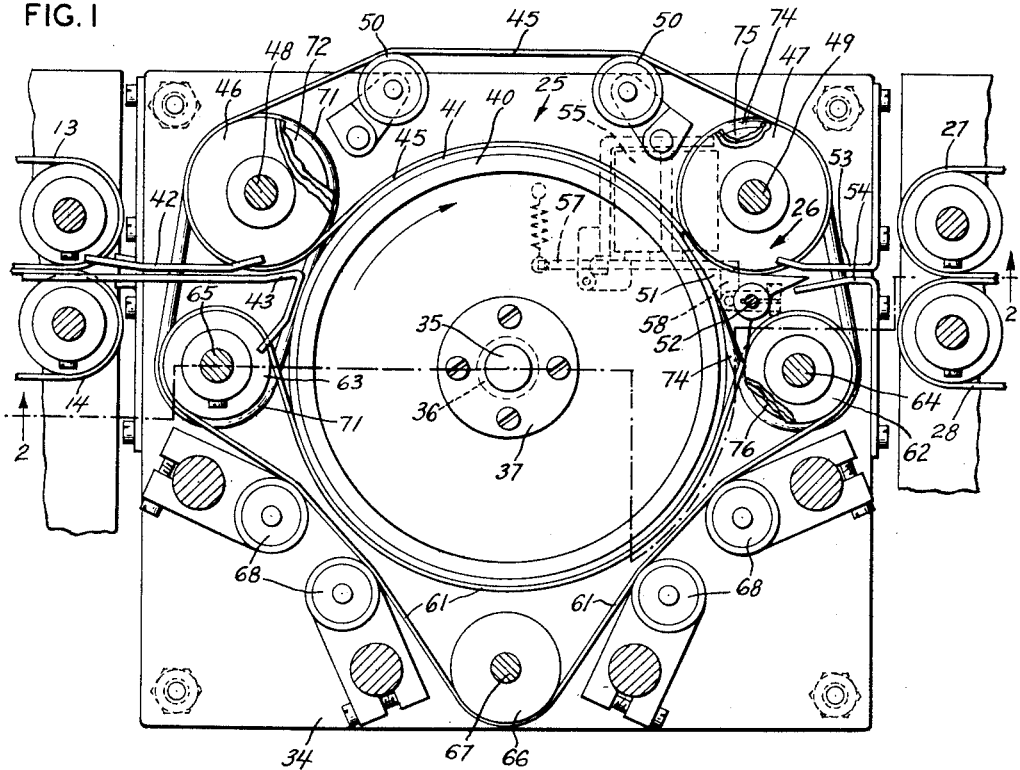
FIG. 1 is a sectional view in side elevation of feed delay mechanisms associating with a document feeding system taken along line 1—1 of FIG. 2.
Figure 2:
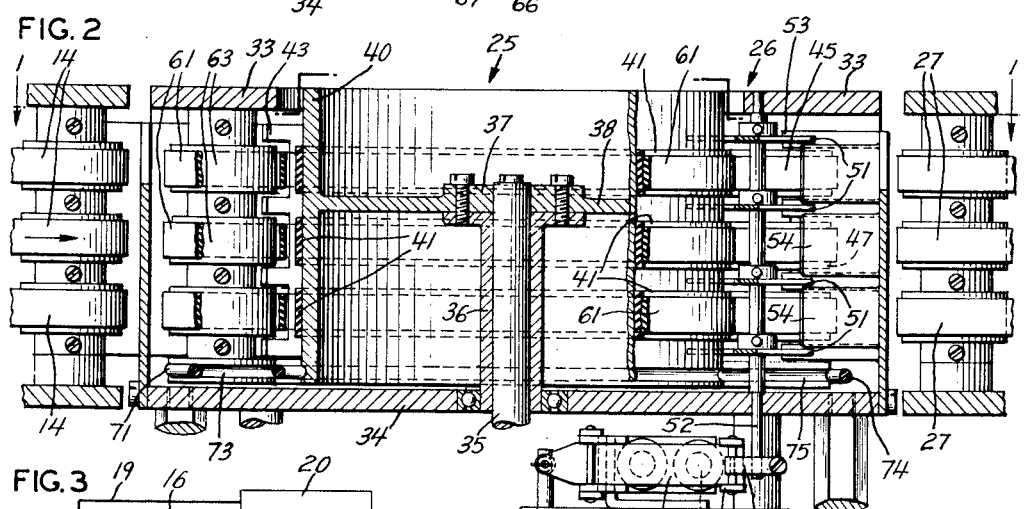
FIG. 2 is a bottom sectional view taken along lines 2—2 of FIG. 1.

FIGS. 1 and 2 illustrate in greater detail the feed drum delay mechanism 25 wherein it will be noted that the mechanism is supported between side frame plates 33, 34 in which is suitably journalled a drive shaft 35. Said shaft carries a sleeve 36 to which is suitably fastened the hub 37 formed in the interior drum web portion 38 which supports the peripheral drum surface 40 in concentric relation to the shaft 35. Shaft 35 is driven by means not shown so as to give the drum a surface velocity equal to that of the associated belt system. Secured to the outer drum surface are bands 41 of material such as rubber or the like having a high coefficient of friction, there being three such bands in the disclosed embodiment spaced apart in an axial direction with respect to the drum so as to provide a broad gripping surface for documents or checks carried along the feed path by the drum. Documents are fed from the feed belts 13, 14 to the drum surface through a feed path defined by guides 42, 43 which are suitably secured to the frame plates 33, 34 and direct the leading edge of each check into contact with the bands 41 on the drum surface.

Cooperating with one segment of the drum surface are a series of endless belts 45, there being three such belts in the disclosed embodiment, one mating with each of the bands 41. Belts 45 are reached around pulleys 46, 47 which are fixed to pulley shafts 48, 49, respectively, suitably journalled in the frame plates 33, 34. The pulleys 46, 47 are so disposed with relation to the drum surface 40 as to cause each of the belts 45 to be drawn snugly about and make contact with a substantial segment of the drum surface. Adjustably mounted rollers 50 are also provided for each of the belts 45 to enable tension of the belts to be suitably regulated.

It will be noted that the guide strips 42, 43 direct each check or document fed from the belt system 13, 14, to the point where the belts 45 make contact with the bands 41 extending around the drum surface. Accordingly, as the drum rotates in a clockwise direction each document will be gripped between the bands 41 and their mating belts 45 and carried by the drum through a predetermined arc of drum rotation.

The documents or checks are thus conveyed by the rotation of the drum to the point where the belt 45 is drawn away from contact with the drum bands 41, which point may be considered to be a switching station which is controlled to determine the subsequent routing of the document through the feed system. Disposed at the switching station are a series of document stripping fingers 51, substantially triangular in outline, and mounted on a rock shaft 52 journalled in frame plates 33, 34. The stripping point of each of the fingers 51 which are disposed medially of the bands 41 is rockable from a position underlying the surface of a document carried by the bands to a position overlying the document. When the finger is in a position underlying the plane of the document carried on the drum surface, the document as it is conveyed by the drum and belt 45 is stripped from the drum surface and directed by the finger in between a pair of guides 53, 54 which in turn direct the leading edge of the document into contact with the feed belts 27, 28 which carry the document to its ultimate destination in one of the receiving pockets 31, 32 as determined by the segregating device under control of the computer as aforesaid.

The switching means is actuated by means of an electro-mechanical actuator 55 mounted on a bracket member 56 suitably secured to the frame plate 34. The armature 57 of the actuator is connected by link 58 with an arm 59 secured to the rock shaft 52. Energization of the actuator operates to rock the shaft 52 to the position where the stripping fingers 51 of the switch mechanism lie above the plane of a document being fed by the drum so as to prevent stripping action, and upon de-energization of the actuator, the armature of which is spring biased, the rock shaft 52 is returned to the position where the stripping fingers 51 lie below the plane of the feeding document.

When the actuator is energized the leading edge of the document is guided into the feed delay path by the under edge of the stripping fingers 51, which delay path is defined by the drum surface orbit starting at the switching station and continuing around in a clockwise direction and back again to the switching station. Cooperating with the drum at a point immediately below the switching station are a series of feed belts 61, of which there is one mating with each of the friction bands 41 extending around the drum surface. Belts 61 are reached around pulleys 62, 63 mounted on shafts 64, 65, respectively, which are suitably journalled in the side frame plates 33, 34. Idler rollers 66 mounted on shaft 67 also serve to guide the belts 61. The disposition of said pulleys 62, 63 and rollers 66 is such as to cause belts 61 to make contact with a substantial segment of the drum surface. Rollers 68 adjustably mounted to bear on the belts 61 serve in the usual manner to keep the proper tension on the belts.

It will be seen that when a document is to be routed for a cyclic delay, the leading edge is guided by the under surface of the stripping fingers 51 to the point where belt 61 makes contact with the drum surface whereupon the document, now in the grip of the belts 61 and the drum surface bands 41, is carried around to the point where the belts 61 part from the drum surface, which point is adjacent the point at which documents are fed to the drum by the conveying belts 13, 14. At this point, it will be noted that the guide strips 43 are formed with a bent under tail portion which serves to guide the leading edge of a document in the grip of belt 61 to the position where the leading edge is again gripped by the belts 45 which continue to feed the document in the same manner as when it was first introduced into the drum feed path from the reading head and through the guide strips 42, 43. The document is thus conveyed by the drum surface and belts 45 to the switching station, the entire time interval or delay since the document first reached the switching station being the equivalent of one feed cycle. Accordingly, if at the end of the delay cycle the computer has completed its processing functions, the switching station may be controlled so as to strip the document from the surface of the drum and direct it through guide strips 53, 54 to the segregating station, and the sorting equipment is again in condition for resuming feed of further documents so as to continue the sorting operation. In the event the computer has not completed its processing function at the end of one cycle delay, the switching station may still be conditioned to prevent stripping action by the fingers 51 so as to route the document for a second delay cycle and so on until the necessity for the delay in the feeding of the document to the segregating station has been removed, permitting the sorter to resume the feeding of additional documents to continue the sorting operation.

It will be noted that the belts 45, 61 are driven from shaft 35 through their frictional engagement with the drum surface bands 41. In order to preclude any possibility of slippage and to provide the belts with a more positive driving force at the time when a document is interposed between one of the belts and the bands 41, means are provided to couple the two belts together so that regardless of the position of a document about the drum, a substantial area of the drum surface bands 41 will always be in frictional engagement with the belt system. The coupling means includes a drive belt 71 drawn around a pulley 72 on shaft 48 and around a pulley 73 fixed on shaft 65. Similarly a drive belt 74 is drawn around a pulley 75 fixed on shaft 49 and a pulley 76 fixed on shaft 64. In this manner it will be seen that when a document is interposed between the drive belt 45 and the drum surface, which document may cover substantially the entire area of the drum engaged by a belt 45, the belt 45 will still derive driving impetus from the frictional engagement of the drum with the belt 61 so as to thereby minimize the tendency of the belt 45 to slip. Likewise when a document is in the grip of belt 61 and the drum, the belt 61 will still derive impetus from the belt 45, then frictionally engaging the drum, as a result of a coupling means provided by the drive belts 71, 74.

From the foregoing, it will be apparent that the feed delay drum 25 and cooperating belt drive means, when incorporated in a feeding system in the manner above described, operates for a portion of a normal feed cycle to convey the document to a switching station where the document may either be routed to the next stage in the feeding system or alternatively may be routed so as to be brought again to the switching station at the completion of one full feeding cycle whereupon the switching mechanism may be controlled to pass the document to the next feeding stage or to again route the document for a feed delay cycle. It will be noted that the size of the drum determines the extent of delay in the feeding of a document, and since equipment of this class ordinarily operates on a cyclic basis, it is deemed preferable that the drum be of such a size so as to execute one complete feed cycle for each revolution. Of course, if the delay device were to be used in equipment where cyclic operation is not required to achieve proper synchronization between the various feed stages of the equipment, the drum could be made of any size conforming to the extent of feed delay require of the device.

While there has been shown and described what is considered to be a preferred embodiment of the device, it is obvious that changes in form could be made without departing from the spirit of the invention, and it is intended therefore that the invention be not limited to the exact form shown and described herein nor to anything less than the whole of the invention as hereinbefore set forth and hereinafter claimed.

What is claimed as new and desired to be secured by Letters Patent is:

1. In a document feeding apparatus of the character described having means for conveying documents seriatim through a plurality of feeding stages, a feed delay device interposed between two successive feeding stages of said apparatus for conveying a document through an alternate delay feed route between said successive stages, said device comprising means for conveying documents along an endless feed path, said endless feed path communicating with the feed path extending from the preceding one of said successive feeding stages and the feed path leading to the subsequent one of said successive feeding stages, and means including a bi-directional switching member electromagnetically controllable according to the presence or absence of an electrical delay control signal to direct any selected document advancing from said preceding stage into or away from said endless feed path and any selected document advancing through said endless feed path for a repeat traversal of said endless feed path or into the feed path leading to said subsequent feeding stage.

2. In a document feeding apparatus of the character described having means for conveying documents seriatim through a plurality of feeding stages, a feed delay device interposed between successive feeding stages of said apparatus for conveying a document through first and second feeding routes between said successive stages, said device comprising means for conveying documents along an endless feed path, one segment of said path constituting a portion of said first feed route, and means including a bi-directional switching member electromagnetically controllable in accordance with the presence or absence of an electrical delay control signal to direct any selected document for repeat traversal of said endless feed path or away from said endless feed path and to the next feeding stage after the document has traversed said one segment of said endless feed path.

3. In a feeding apparatus of the character described having means for conveying documents seriatim at a predetermined rate of speed between successive feeding stages, a rotating drum driven at said rate of speed and interposed between successive feeding stages, belt means engaging the peripheral surface of said drum means for retaining a document introduced between said surface and said belt means in frictional engagement with said drum surface, switching means effective in a first setting for stripping a document from said drum means for advance directly to the next feeding stage, said switching means being effective in another setting for causing the document to continue in frictional engagement with the surface of said drum means and preventing the document from feeding directly to the next feeding stage, and electromagnetic means responsive to the presence or absence of an electrical delay control signal for selectively actuating said switching means.

4. In a feeding apparatus of the character described having means for conveying documents seriatim at a predetermined rate of speed between successive feeding stages, a feed drum rotating at said predetermined rate of speed, one feed belt means strung to engage with the drum surface over a first segment of the drum orbit, means for introducing a document between said drum surface and said belt means at one extremity of said segment of the drum orbit, second feed belt means strung to engage with the drum surface over a second segment of the drum orbit, said first and second segments defining an endless feed path, and switching means controllable to select alternate feed routes for any one of said documents from the other extremity of said first segment, one of said feed routes extending from the drum orbit to the next feeding stage, the other of said feed routes continuing along said endless feed path through said second segment of the drum orbit.

5. In a feeding apparatus of the character described having means for conveying documents seriatim at a predetermined rate of speed between successive feeding stages, a feed drum rotating at said predetermined rate of speed, belt means engaging the peripheral surface of said drum and driven by frictional contact with said drum surface, said belt means cooperating with the drum surface to establish gripping contact with a document introduced therebetween, means for introducing a document advancing from a preceding feeding stage between said belt means and the drum surface at a first point in the orbit of said drum, and means operable at another point in the orbit of said drum for stripping a document from said drum surface and directing it to a subsequent feeding stage, said last mentioned means being controllable to prevent said stripping of any selected document and cause the document to continue along the drum orbit in the grip of said belt means and said drum surface.

6. The invention according to claim 5 wherein said belt means comprises first and second endless belt means, said first belt means being disposed to engage said drum along a first segment of the drum orbit, said second endless belt means being disposed to engage said drum along a second segment of the drum orbit, said first and second points in the drum orbit being located between said first and second segments of the drum orbit.

7. The invention according to claim 6 wherein each of said first and second endless belt means comprises a plurality of belts disposed in parallel spaced apart relation to each other and driven along coplanar paths of travel.

8. The invention according to claim 5 wherein the surface of said drum is provided with bands extending circumferentially about the drum, said bands being formed of a material having a high co-efficient of friction and disposed for driving engagement with said belt means.

9. The invention according to claim 5 including an electromagnetic actuator for controlling said means operable for stripping a document from said drum surface.

References Cited in the file of this patent

UNITED STATES PATENTS

| | | |
|---|---|---|
| 2,721,644 | Kile | Oct. 25, 1955 |
| 2,822,170 | Frantz | Feb. 4, 1958 |
| 2,936,169 | Nelson et al. | May 10, 1960 |